United States Patent [19]
Anthony et al.

[11] 3,878,871

[45] Apr. 22, 1975

[54] CORROSION RESISTANT ALUMINUM COMPOSITE

[75] Inventors: William H. Anthony; James M. Popplewell, both of Guilford, Conn.

[73] Assignee: Saliss Aluminium Ltd., Chippis, Switzerland

[22] Filed: Nov. 12, 1973

[21] Appl. No.: 414,862

[52] U.S. Cl. ................ 138/140; 29/191; 29/191.6; 29/195; 29/197.5; 75/141; 75/146; 75/148
[51] Int. Cl. ...................... B32b 15/00; C22c 21/02
[58] Field of Search ....... 29/183, 183.5, 191, 191.6, 29/195, 197, 197.5; 75/141, 142, 143, 147, 148, 146; 138/140

[56] References Cited
UNITED STATES PATENTS

3,312,535  4/1967  Anderson et al. ................ 29/183.5
3,496,620  2/1970  Wolfe ............................... 29/197.5

*Primary Examiner*—R. Dean
*Attorney, Agent, or Firm*—Robert H. Bachman

[57] ABSTRACT

A corrosion resistant aluminum composite material is disclosed which comprises a core containing from 0.2 to 0.8% manganese and from 0.05 to 0.5% silicon with the balance being essentially aluminum, and a layer of cladding material metallurgically bonded to at least one surface of the core with the cladding material consisting of from 0.8 to 1.2% manganese, and from 0.1 to 0.4% zinc, with the balance being essentially aluminum. The core material is particularly resistant to pitting corrosion. The composite material possesses a unique combination of corrosion resistance and good mechanical properties and is highly suited for the fabrication of objects for use in aqueous environments.

15 Claims, No Drawings

CORROSION RESISTANT ALUMINUM COMPOSITE

BACKGROUND OF THE INVENTION

A great deal of effort has been made to use aluminum and aluminum base alloys in situations where the alloys contact flow streams of impure water. Specific attempts have been made to use aluminum alloys in heat exchangers wherein at least one of the fluids in the heat exchanger is impure water. In general, these efforts have not been successful and a great deal of difficulty has been encountered with the corrosion of alloys heretofore used.

The primary difficulty encountered with the use of aluminum alloys in aqueous situations is localized corrosion or pitting. Once small pits start to form, corrosion activity is largely limited to these pits and perforations and failure of the alloy occurs much more rapidly then it would if the corrosion were more general instead of being highly localized.

The preceding problem has been largely overcome by the novel composite material of the present invention. The composite material of the present invention possesses an extremely low general corrosion rate and has the property that pit depth is largely limited to the thickness of the cladding layer. Furthermore, the core possesses exceptional pitting resistance even when not protected by the cladding.

SUMMARY OF THE INVENTION

The composite material of the present invention consists of an aluminum alloy core containing from 0.2 to 0.8% manganese and from 0.05 to 0.5% silicon, balance essentially aluminum. Metallurgically bonded to this core is an aluminum alloy cladding which contains from 0.8 to 1.2% manganese and from 0.1 to 0.4% zinc, balance essentially aluminum.

The core alloy possesses a unique resistance to pitting corrosion. The cladding alloy is anodic with respect to the core material and provides sufficient galvanic current for corrosion protection. The general corrosion rate of the cladding material is low relative to other commonly used aluminum cladding alloys. Thus, a relatively thin layer of cladding material can provide long term corrosion protection to the core material.

The composite material of the present invention may easily be fabricated using conventional commercial practice to join the two components by pressure welding. Additional advantages and benefits of the present invention will be made more apparent through reference to the following Description of the Preferred Embodiments in combination with the Drawings and the Claims.

DESCRIPTION OF THE PREFERRED EMBODIMENTS

The composition of the components of the present invention is given in weight percentages in the following description unless otherwise specified.

The broad and preferred composition limits for the core material of the present invention are given in Table I below:

TABLE I

|  | Broad | Preferred |
|---|---|---|
| Magnesium | 0 – .3 | 0 – .1 |
| Manganese | .2 – .8 | .3 – .6 |
| Chromium | 0 – .1 | 0 – .05 |
| Silicon | .05 – .5 | .15 – .25 |
| Copper | 0 – .1 | 0 – .05 |
| Zinc | 0 – .1 | 0 – .05 |
| Titanium | 0 – .2 | .005 – .15 |
| Iron | 0 – .2 | 0 – .08 |

The essential components of the core are manganese and silicon. The other elements listed in Table I have not been found to significantly effect the properties of the core alloy when they are present within the limits shown in the Table. Titanium may be present as a purposeful addition since it has been found to provide beneficial grain refining effect, thereby improving the mechanical properties of the core material. Naturally, any of the foregoing, non-essential impurity elements may be present in levels as low as 0.001%.

The broad and preferred ranges for the cladding material are given in Table II below: n

TABLE II

|  | Broad | Preferred |
|---|---|---|
| Magnesium | 0 – .1 | 0 – .05 |
| Manganese | .8 – 1.2 | .9 – 1.1 |
| Chromium | 0 – .1 | .02 – .05 |
| Silicon | 0 – .05 | 0 – .03 |
| Copper | 0 – .05 | 0 – .01 |
| Zinc | .1 – .4 | .15 – .25 |
| Titanium | 0 – .1 | .005 – .03 |
| Iron | 0 – .1 | 0 – .08 |

The essential constituents of the cladding alloy are manganese and zinc. The remaining elements listed in Table II may be present as impurities up to the level listed in the Table without adversely affecting the properties of the cladding alloy. Naturally, any of the foregoing impurities may be present in levels as low as 0.001%.

The alloy composition of the core component was developed to have a relatively low corrosion and pitting rate while the cladding material was formulated to provide exceptional galvanic protection to the core material along with a low general corrosion rate.

The composite of the present invention may be produced utilizing a wide variety of processes. Typical processes which may be utilized include processes which utilize cold deformation such as swaging or rolling and processes which utilize the deformation at elevated temperatures such as hot rolling. An exemplary process for the fabrication of the composite of the present invention is described in U.S. Pat. No. 3,381,366 issued to Joseph Winter and assigned to the Assignee of the present application. Of course, other well known processes such as those used to produce Alclad sheet may be used.

The composite of the present invention has a wide variety of uses. Almost any metallic item intended for use in a corrosive aqueous environment at moderate temperatures may be fabricated from the composite of the present invention. The thickness of the cladding material generally between 2 and 20% of the total thickness of the composite. The thickness of the core may be established on the basis of mechanical properties which the finished item must possess. In general, the cladding thickness will range from 0.001 to 0.100 inches.

If the composite is produced in the form of sheet, further objects such as tubing may readily be fabricated from the sheet. If tubing is fabricated from the composite of the present invention for heat exchange purposes, the tubing will preferably have a wall thickness of from 0.010 to 0.10 and a cladding thickness of from 0.001 to 0.020 inches. Tubing made of the material of the present invention may be fabricated into further objects such as fin on tube heat exchangers. Of course, pipe having a wall thickness as great as 1.0 inch may also be fabricated from the composite of the invention.

Normally, it is only necessary to place a cladding surface on that surface which is to be exposed to the corrosive aqueous environment. As for example, in a surface condensor used to condense waste steam using corrosive cooling water, the cladding would be present only on the water side. However, in the fabrication of the tubing heat exchanger to exchange heat between two media, both of which are corrosive it would be necessary to fabricate the tubing from a composite material having cladding on both sides.

These alloys were case, homogenized for 16 hours at 1,100°F and were then reduced to 0.050 inch gauge H14 temper strip by conventional processing techniques. Samples of these alloys were exposed to a flowing stream of New Haven tap water at a velocity of 4 ft./sec. in a semi-circulating system. The water was partially replenished on a continuous basis at a rate of about 10% per hour. The water was maintained at a constant temperature of 30°C. The samples were exposed to this environment for 180 days and samples were removed at 60 day intervals prior to the 180 day final examination. Commercial alloys in generally similar conditions were exposed to the same environment for comparative purposes. Table III lists the composition of sample alloys along with various measured corrosion parameters at 60, 120 and 180 days. Table IV lists the approximate composition of the water to which the samples were exposed.

It is evident from these experimental results that alloys containing controlled amounts of silicon and manganese in an aluminum base containing a limited amount of iron have about twice the resistance to pitting as the commercial alloys which were tested at the same time.

Table III

Comparison of Corrosion of Selected Experimental
Alloys with Control Commercial Alloys Exposure To
Flowing New Haven Tap Water for Periods Up to 170 Days

| Percentage Composition | | | | | | Weight Loss mg cm$^{-2}$ | | | Mean Pit Depth Mils | | | Maximum Pit Depth Mils | | |
|---|---|---|---|---|---|---|---|---|---|---|---|---|---|---|
| Fe | Si | Mn | Mg | Cr | Cu | 60 days | 120 days | 180 days | 60 days | 120 days | 180 days | 60 days | 120 days | 180 days |
| .05 | .23 | .31 | — | — | — | 15.1 | 25.1 | 35.1 | 8.4 | 8.7 | 12.6 | 17.8 | 12.4 | 21.0 |
| .06 | .23 | .45 | — | — | — | 15.4 | 23.9 | 33.6 | 8.8 | 9.5 | 11.7 | 15.3 | 15.8 | 15.3 |
| .06 | .10 | .61 | 1.04 | .21 | — | 10.3 | 18.7 | 23.1 | 16.7 | 12.4 | 19.4 | 22.4 | 19.3 | 26.4 |
| 6061 | T6 | | | | | 20.9 | 30.4 | 24.1 | 16.4 | 19.4 | 21.5 | 24.0 | 36.0 | 34.4 |
| 1100 | H14 | | | | | 15.5 | 27.2 | 34.3 | 26.9 | 26.3 | 33.7 | 43.7 | 39.2 | 39.8 |
| 3003 | H14 | | | | | 17.7 | 26.2 | 29.2 | — | — | — | 27.4* | 27.4* | 27.4* |
| 3004 | H14 | | | | | 15.2 | 26.7 | 29.2 | 13.5 | — | — | 33.6 | 38.0* | 38.0* |
| 5050 | H34 | | | | | 8.0 | 15.4 | 23.2 | — | — | — | 43.2* | 43.2* | 43.2* |
| 5052 | H34 | | | | | 5.1 | 10.6 | 17.2 | — | — | — | 39.2* | 39.2* | 39.2* |

The symbols — and * mean that the sheet has been perforated from one side.
The starred figure is the gauge of the sheet.

The preceeding discussion of the present invention will be better understood through consideration of the following illustrative examples:

EXAMPLE I

It has been found that pit formation generally starts at a defect in the surface of the alloy. It has further been found that aluminum-silicon solid solutions generally resist pitting better than high purity aluminum alloys. A particular type of defect which is extremely troublesome with regard to pit formation are iron bearing particles or inclusions such as $FeAl_3$. The core alloy of the present invention has been designed to have silicon in solid solution and have a minimum of iron containing particles. Manganese has been added to surpress the formation of $FeAl_3$. It has been found that particles containing manganese such as $MnAl_6$ do not measurably effect the corrosion behavior of the alloy.

Three castings of different compositions were produced in order to verify the reasoning discussed above.

TABLE IV

| | | |
|---|---|---|
| Chlorides | 12.0 | ppm |
| Hardness (CaCO$_3$) | 38.0 | ppm |
| Alkalinity (CaCO$_3$) | 20.0 | ppm |
| CO$_2$ | 3.0 | ppm |
| O$_2$ | 12.0 | ppm |
| Calcium | 14.2 | ppm |
| Copper | 0.05 | ppm |
| Iron | 0.15 | ppm |
| Magnesium | 0.0 | ppm |
| Sodium | 4.0 | ppm |
| Sulfate | 65.0 | ppm |
| Total Solids | 100.0 | ppm |
| pH | 6.8 | ppm |

EXAMPLE II

This Example illustrates the corrosion behavior of alloys containing about .2% zinc with varying amounts of silicon and manganese. These alloy compositions were selected on the basis of electro-chemical behavior to be galvanically protecting to the alloys of Example I. The spectroscopic analysis of these alloys is shown in Table V.

TABLE V

| | Si | Fe | Mn | Zn | Mg | Cr | Cu | Ti |
|---|---|---|---|---|---|---|---|---|
| 1. | .03 | .062 | 1.09 | .165 | <.01 | .02 | <.01 | .010 |
| 2. | .215 | .066 | 0.54 | .165 | <.01 | .01 | <.01 | .014 |

These ingots were processed in the same manner as the ingots of Example I to produce 0.050 inch gauge material in the H14 temper. Galvanic couples of the two alloys shown in Table V and the first two alloys shown in Table III were fabricated and exposed to flowing New Haven tap water as described in Example I. The resultant current between an anode and cathode was measured as a function of time. The resultant data indicates that a cladding alloy containing about 1% manganese, 0.17% zinc, and 0.03% silicon provides an adequate protective current to a cathode containing 0.2% silicon, and 0.5% manganese. However, an anode consisting of 0.2% silicon, 0.5% manganese, and 0.17% zinc failed to protect a very similar cathode alloy containing 0.2% silicon and 0.3% manganese. Thus, there appears to be a critical minimum level of manganese and a low maximum silicon level required in the cladding alloy before cladding alloys of this type containing about 0.2% zinc will effectively protect the low pitting rate of alloys of Example I.

EXAMPLE III

A composite material was produced based on the information developed in previous experiments. The composition of the cladding and the core of this composite is listed below.

TABLE VI

| | Percentage Spectroscopic Analysis Of Example III Clad and Core Alloy Ingots | | | | | | | |
|---|---|---|---|---|---|---|---|---|
| | Si | Fe | Cu | Mn | Mg | Cr | Zn | Ti |
| Ingot A Cladding | .035 | .070 | >.01 | 1.07 | >.01 | >.02 | .168 | 0.0135 |
| Ingot B Core | .198 | .075 | — | .310 | — | — | — | 0.0088 |

The cladding and core material were initially produced in the form of ingots having a thickness of 1.75 inches. The ingots were homogenized for 12 hours at 1,100°F. The cladding ingot was hot rolled to a gage of 0.125 inch using a hot rolling temperature of 800°F. The core ingots were milled to a thickness of 1.25 inches. The surfaces to be bonded together were cleaned by wire brushing and vapor decreasing. The hot rolled cladding ingot was cut into two parts and welded to the core ingot. Cladding and core combination was then hot rolled at 800°F to a gage of 0.15 inch. The material was then air cooled and given a final cold reduction to 0.060 inch gage, resulting in a cladding thickness of about 10% of the total thickness. The longitudinal tensile properties of the finished material were as follows:

TABLE VII

| | |
|---|---|
| 0.2% Offset Yield Strength | 20.9 KSI |
| Ultimate Strength | 27.1 KSI |
| % Elongation In 2 Inches | 3.9 |

The experimental clad material was exposed to flowing New Haven tap water for periods of 60 and 120 days. Control samples were also exposed for the same time periods and included samples of Alclad 3004-0, 3003 H14, 5052 H36 and 6061 T6. The Alclad 3004 had a 3 mil cladding thickness. The samples were then evaluated for corrosion damage and the results are tabulated below in Table VIII.

TABLE VIII

| | Corrosion Of Experimental Alloy And Controls In Flowing New Haven Tap Water At 30°C | | | |
|---|---|---|---|---|
| | Exposure Time | Wt. Loss mg/cm² | Mean Pit Depth (mils) | Max. Pit Depth (mils) |
| Example III Alloy Composite, H16 | 60 | .878 | 5.0 | 7.1 |
| | 120 | 5.9 | 7.7 | 9.0 |
| Alclad 3004-0 | 60 | 8.6 | 8.4 | 10.4 |
| | 120 | 14.9 | 17.2 | 26.1 |
| 3004 H14 | 60 | 8.9 | 8.4 | 10.7 |
| | 120 | 16.3 | 10.8 | 14.3 |
| 5052 H34 | 60 | 1.5 | 18.7 | 25.6 |
| | 120 | 7.7 | 30.2 | 36.2 |
| 6061 T6 | 60 | 5.7 | 9.9 | 15.5 |
| | 120 | 16.1 | 15.3 | 18.5 |

It is apparent from these results that the general corrosion rate of the present invention is considerably less than that of Alclad 3004 and the 3003 alloy. It is significant that both the mean and max. depths of the experimental composite are significantly less than pit depths measured in the control alloys. The mean pit depth in the experimental alloys is approximately equal to the cladding thickness while the mean pit depth in the Alclad 3004 is nearly three times the cladding thickness. This demonstrates the effectiveness of the cladding in preventing pitting of the core alloy of the present invention.

EXAMPLE IV

Despite the good corrosion behavior of the present composite, demonstrated in the previous example, it would be highly desirable if corrosion damage could be further reduced or even eliminated. It has been found that a film of aluminum hydroxide, in the form of Boehmite $Al_2OH$, can afford further significant improvements in corrosion resistance. The maximum protective effect is observed when the thickness of the Boehmite is between 2,000 and 20,000 Angstroms. For example, two samples of the experimental clad alloy discussed in Example III were machined so as to have a series of 7 mil deep slots in the surface of the composite. Since the thickness of the cladding layer is less than this, the machining operation serves to expose the core of the composite. This exposure of the core composite was intended to simulate forming operations which might destroy the integrity of the cladding layer. In particular, the slots were intended to simulate the welded joint in a tube formed from strip by a welding and scarfing process.

One of the samples was exposed to steam at 250°F for 8 hours to provide a Boehmite film having a thickness of approximately 8750 Angstroms. The other sample was left untreated. The Boehmite treated specimen was then scratched on the opposite surface to the machines slots to simulate the effect of scouring of a condenser tube by solids carried through in the cooling water or by a cleaning operation. Both samples were then exposed to flowing New Haven tap water for a period of 60 days. After this 60 day exposure the samples were evaluated for corrosion damage. The results are summarized below in Table IX.

TABLE IX

General Corrosion Evaluation Of Example IV Test Samples

| Material | Exposure Time Days | Weight Loss mg/cm$^2$ | Max. Pit Depth in slotted area (mils) | Mean Pit Depth in cladding (mils) | Max. Pit Depth in cladding (mils) |
|---|---|---|---|---|---|
| Bare | 60 | .878 | 2.5 | 5.0 | 7.1 |
|  | 120 | 5.9 | 10.3 | 7.7 | 9.0 |
| Boehmite | 60 | 0 | no attack | ** | 2.8* |
|  | 120 | .27 | no attack | ** | 2.9* |

*Crevice corrosion near point of support.
**Insufficient data to form an accurate mean value.

It is apparent that the Boehmite treatment has significantly reduced the corrosion tendency of the composite material over the time period investigated. In particular, the weight loss in milligrams per square centimeter was 0, to within the limits of the experimental apparatus used, and the only sign of pit formation was a form of crevice corrosion which occurred near the point where the samples were supported. This form of corrosion can easily be avoided by proper design. Even the destruction of the Boehmite film integrity by scratching does not lead to pit formation.

What is claimed is:

1. A corrosion resistant aluminum alloy composite comprising:
   A. an aluminum alloy core consisting essentially of from 0.001 to 0.3% magnesium, 0.2 to 0.8% manganese, 0.001 to 0.1% chromium, 0.001 to 0.2% titanium, 0.05 to 0.5% silicon, 0.001 to 0.2% iron, 0.001 to 0.1% copper, and 0.001 to 0.1% zinc, balance aluminum; and
   B. an aluminum alloy cladding, metallurgically bonded to at least one surface of the core, consisting essentially of from 0.001 to 0.1% magnesium, 0.8 to 1.2% manganese, 0.001 to .1% chromium, .001 to .1% titanium, 0.001 to 0.05% silicon, 0.001 to 0.05% copper, 0.1 to 0.4% zinc, and 0.001 to 0.1% iron, balance aluminum.

2. A composite as in claim 1 wherein the core contains from 0.001 to 0.1% magnesium, 0.3 to 0.6% manganese, 0.001 to 0.05% chromium, 0.005 to .15% titanium, 0.15 to 0.25% silicon, 0.001 to 0.08% iron, 0.001 to .05% copper, 0.001 to 0.05% zinc, balance aluminum.

3. A composite as in claim 1 wherein the cladding contains 0.001 to 0.05% magnesium, 0.9 to 1.1% manganese, 0.02 to 0.05% chromium, 0.005 to 0.03% titanium, 0.001 to 0.03% silicon, 0.001 to 0.01% copper, 0.15 to 0.25% zinc, and 0.001 to 0.08% iron, balance aluminum.

4. A composite as in claim 1 wherein the cladding has a thickness of 0.001 to 0.100 inches.

5. A corrosion resistant aluminum alloy composite comprising:
   A. an aluminum alloy core consisting essentially of from 0.001 to 0.3% magnesium, 0.2 to 0.8% manganese, 0.001 to 0.1% chromium, 0.001 to 0.2% titanium, 0.05 to 0.5% silicon, 0.001 to 0.2% iron, 0.001 to 0.1% copper, and 0.001 to 0.1% zinc, balance aluminum;
   B. an aluminum alloy cladding, metallurgically bonded to at least one surface of the core consisting essentially of from 0.001 to 0.1% magnesium, 0.8 to 1.2% manganese, 0.001 to 0.1% chromium, .001 to .1% titanium, 0.001 to 0.05% silicon, 0.001 to 0.05% copper, 0.1 to 0.4% zinc, and 0.001 to 0.1% iron, balance aluminum; and
   C. a layer of Boehmite, having a thickness of from 2,000 to 20,000 A, formed on the cladding.

6. A composite as in claim 5 wherein the core contains from 0.001 to 0.1% magnesium, 0.3 to 0.6% manganese, 0.001 to 0.05% chromium, 0.005 to .15% titanium, 0.15 to 0.25% silicon, 0.001 to 0.08% iron, 0.001 to 0.05% copper, 0.001 to 0.05% zinc, balance aluminum.

7. A composite as in claim 5 wherein the cladding contains 0.001 to 0.05% magnesium, 0.9 to 1.1% manganese, 0.02 to 0.05% chromium, 0.005 to 0.03% titanium, 0.001 to 0.03% silicon, 0.001 to 0.01% copper, 0.15 to 0.25% zinc, and 0.001 to 0.08% iron, balance aluminum.

8. A composite tubing comprising:
   A. an aluminum alloy core consisting essentially of from 0.001 to 0.3% magnesium, 0.2 to 0.8% manganese, 0.001 to 0.1% chromium, 0.001 to .2% titanium, 0.05 to 0.5% silicon, 0.001 to 0.2% iron, 0.001 to 0.1% copper, and 0.001 to 0.1% zinc, balance aluminum; and
   B. an aluminum alloy cladding, metallurgically bonded to at least one surface of the core, consisting essentially of from 0.001 to 0.1% magnesium, 0.8 to 1.2% manganese, 0.001 to 0.1% chromium, 0.001 to 0.1% titanium, 0.001 to 0.05% silicon, 0.001 to 0.05% copper, 0.1 to 0.4% zinc, and 0.001 to 0.1% iron, balance aluminum.

9. A composite tubing as in claim 8 wherein the core contains from 0.001 to 0.1% magnesium, 0.3 to 0.6% manganese, 0.001 to 0.05% chromium, 0.005 to 0.15% titanium, 0.15 to 0.25% silicon, 0.001 to 0.08% iron, 0.001 to 0.05% copper, 0.001 to 0.05% zinc, balance aluminum.

10. A composite as in claim 8 wherein the cladding contains 0.001 to 0.05% magnesium, 0.9 to 1.1% manganese, 0.02 to 0.05% chromium, 0.005 to 0.03% titanium, 0.001 to 0.03% silicon, 0.001 to 0.01% copper, 0.15 to 0.25% zinc, and 0.001 to 0.08% iron, balance aluminum.

11. A composite tubing as in claim 8 wherein the cladding has a thickness of 0.001 to 0.100 inches.

12. A composite tubing comprising:
A. an aluminum alloy core consisting essentially of from 0.001 to 0.3% magnesium, 0.2 to 0.8% manganese, 0.001 to 0.1% chromium, 0.001 to 0.2% titanium, 0.05 to 0.5% silicon, 0.001 to 0.2% iron, 0.001 to 0.1% copper, and 0.001 to 0.1% zinc, balance aluminum;
B. an aluminum alloy cladding, metallurgically bonded to at least one surface of the core, consisting essentially of from 0.001 to 0.1% magnesium, 0.8 to 1.2% manganese, 0.001 to 0.1% chromium, 0.001 to 0.1% titanium, 0.001 to 0.05% silicon, 0.001 to 0.05% copper, 0.1 to 0.4% zinc, and 0.001 to 0.1% iron, balance aluminum; and
C. a layer of Boehmite, having a thickness of from 2,000 to 20,000 A, formed on the cladding.

13. A composite tubing as in claim 12 wherein the core contains from 0.001 to 0.1% magnesium, 0.3 to 0.6% manganese, 0.001 to 0.05% chromium, 0.005 to 0.15% titanium, 0.15 to 0.25% silicon, 0.001 to 0.08% iron, 0.001 to 0.05% copper, and 0.001 to 0.05% zinc, balance aluminum.

14. A composite tubing as in claim 12 wherein the cladding contains 0.001 to 0.05% magnesium, 0.9 to 1.1% manganese, 0.02 to 0.05% chromium, 0.005 to 0.03% titanium, 0.001 to 0.03% silicon, 0.001 to 0.01% copper, 0.15 to 0.25% zinc, and 0.001 to 0.08% iron, balance aluminum.

15. A composite tubing as in claim 12 wherein the cladding has a thickness of 0.001 to 0.100 inches.

* * * * *